April 13, 1943.   L. T. H. GREIG   2,316,578
PIPE COUPLING
Original Filed Dec. 19, 1941
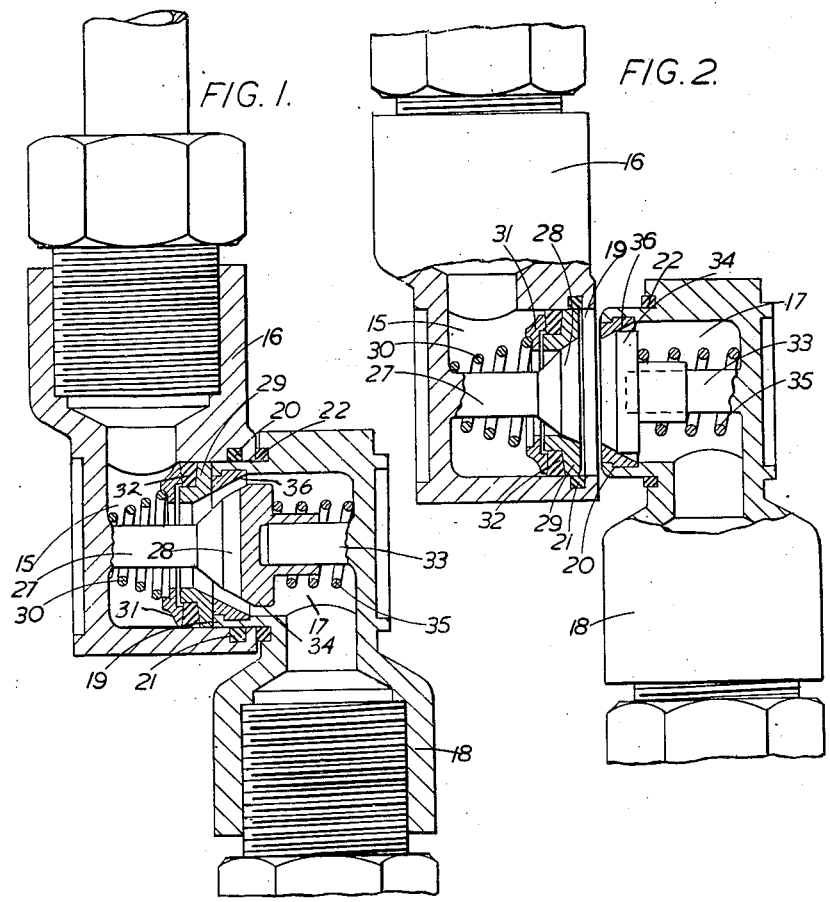
Inventor
Louis Thomas Hutchison Greig
By
Stevens and Davis
his Attorneys Patented Apr. 13, 1943

2,316,578

UNITED STATES PATENT OFFICE 2,316,578

PIPE COUPLING

Louis Thomas Hutchison Greig, Nazeing, England
Original application December 19, 1941, Serial No. 423,673, now Patent No. 2,310,073, dated February 2, 1943. Divided and this application October 15, 1942, Serial No. 462,174. In Great Britain December 5, 1940

3 Claims. (Cl. 284—17)

This invention relates to pipe couplings and particularly to self-sealing pipe couplings comprising two separable hollow members mounted respectively on the terminal portions of the pipes to be coupled and provided with valves tending to close their respective pipe terminals but operating to open each other by abutment of the valves and valve seatings upon connection of the coupling members.

In known couplings of the above character it has been the practice to provide an abutment seal for preventing leakage between the two coupling parts but with such form of sealing a tight joint is not effected until the connection of the coupling parts is completed and, in some cases, the moment of opening of the valves is partly dependent upon the resiliency of the seal.

It is the object of the present invention to provide a method of sealing the coupling in which these disadvantages are overcome and which will prevent leakage from the coupling parts upon disconnection and entry of air to the pipe lines upon reconnection.

The invention consists in the provision of a seating for one of said valves acting as a spigot in a socket of the opposed coupling part, a seal or packing provided in said socket adapted to close the joint upon coupling.

Preferably, the said seal is disposed in a transverse plane extending through the abutting faces of the coupling parts at the movement of first connection.

Reference will now be made to the accompanying drawing which illustrates a preferred embodiment of the invention and wherein Fig. 1 is a sectional elevation showing the improved coupling with the coupling parts fully interengaged and Fig. 2 is a view similar to Fig. 1 but showing the coupling parts disconnected.

The coupling shown comprises two hollow fittings 15, 17 embodying inlet and outlet connections 16, 18 respectively, said connections extending laterally of the fittings. The fittings 15, 17 present to each other open throats 19, 20 respectively, the throat 19 being formed by a socket-like opening in the member 15 whilst the throat 20 is formed by a cylindrical extension provided on the member 17 and constituting a spigot for engagement in the socket of member 15.

The two fittings 15, 17 are each provided with a spring loaded valve mechanism for sealing off the terminal portions of the pipes upon disconnection of the coupling, said valve mechanisms comprising a fixed rigid valve stem 27 extending coaxially of the inlet fitting, which stem at its outer end carries a valve head 28. The valve head 28 is fixed, and the movable valve element is constituted by an annular seating 29 which is urged towards the valve head by a compression spring 30. Interposed between the compression spring 30 and the annular valve part 29 is a pressure plate 31 which serves to compress a packing washer 32.

Extending axially of the hollow outlet fitting 17 is a valve spindle 33 on which a movable valve head 34 is slidable axially, being urged by means of a compression spring 35 towards a fixed valve seating 36.

Referring now to the features of the present invention there is provided for sealing the coupling against leakage in the assembled condition a resilient sealing washer 21 located in a groove formed in the outer throat or socket 19, said sealing washer having an internal diameter such as to provide an interference fit with the cooperating inner throat member or spigot 20, that is, the washer provides a fluid tight joint by engagement with the periphery of the spigot but allows sliding movement of the spigot relative to the washer. The washer 21 is arranged so as to extend in a transverse plane passing through the abutting faces of the coupling parts, that is, the flush valve faces and seatings, at the moment of first connection of said parts.

If desired, an abutment seal 22 may be located in a groove formed in the wall or in a stepped portions of the fitting 17 adjacent the inner end of the throat 20 so as to be squeezed between this wall and the outer end of the throat 19 when the coupling is completely assembled.

It is important to note that when the coupling parts are separated the valve faces and seatings provide flush surfaces, and thus the opposed members can be presented to each other with virtually complete air exclusion. In addition, by the positioning of the seal or packing 21 about the abutting faces the coupling is sealed against entry of air from the commencement of the opening movements of the valves. Thus the invention provides a construction which is particularly suitable for use with hydraulic circuits in which the medium employed is constituted by liquid which needs to be kept entirely free of air.

This application is a division of application Serial No. 423,673, filed December 19, 1941, which has matured into Patent No. 2,310,073, granted February 2, 1943.

I claim:

1. A self-sealing coupling comprising, a first conduit terminating in a cylindrical socket, a second conduit terminating in a cylindrical projection, adapted for insertion in said socket, a packing ring countersunk within said socket adjacent its end in a position to lie between the cylindrical surfaces of the projection and socket when they are engaged, a valve in said socket, means for rigidly supporting said valve in the plane of said packing ring, said valve defining with said ring an annular space, an annular valve seat, resilient means urging said annular valve seat to close said annular space, means defining a rigid annular valve seat on the end of said projection, a second valve coacting with said rigid valve seat, and means resiliently urging said second valve against said rigid valve seat to close off the end of said projection, said valves and said seats being in a position and of a size to mutually abut when the projection is inserted in the socket, whereby upon such insertion the rigid valve seat and valve displace, respectively, the resiliently urged valve seat and valve to open the ends of both conduits for intercommunication, while the packing ring coacts with the annular valve seat when the socket is closed and with the cylindrical surface of the projection when it is open to prevent leakage in both cases.

2. A self-sealing coupling comprising, a first conduit terminating in a cylindrical socket, a second conduit terminating in a cylindrical projection adapted for insertion in said socket, a packing ring countersunk within said socket adjacent its end in a position to lie between the cylindrical surfaces of the projection and socket when they are engaged, a valve in said socket defining therewith an annular space of a diameter increasing rearwardly of the end of the valve, means for rigidly supporting said valve in the plane of said packing ring, an annular valve seat, said valve seat having a portion of reduced external diameter, a resilient packing ring overlying said portion of reduced diameter, a follower, a spring acting on said follower to compress said resilient packing ring and to urge said valve seat to a position closing the annular space defined by the valve and socket, means defining a rigid annular valve seat on the end of said projection, a second valve coacting with said rigid valve seat, and means resiliently urging said second valve against said rigid valve seat to close off the end of said projection, said valves and said seats being in a position and of a size to mutually abut when the projection is inserted in the socket, whereby upon such insertion the rigid valve seat and valve displace, respectively, the resiliently urged valve seat and valve to open the ends of both conduits for intercommunication while initial movement of the resiliently urged annular valve seat further loads the spring to further compress the resilient packing ring to afford a seal during the act of engagement, the other packing ring functioning to seal the socket when it is closed and to seal between the socket and projection when they are engaged.

3. A self-sealing coupling as claimed in claim 1 in which each conduit is curved at a point rearwardly of the respective valve and in which the means for rigidly supporting the first mentioned valve is a stem extending straight from a portion of the conduit wall beyond the bend to the valve and in which the means resiliently urging the second valve is a telescoping valve stem extending straight from a portion of the conduit wall beyond the bend to the second valve, whereby the resultant force of compression is transmitted along straight lines to a side wall of the conduits.

LOUIS THOMAS HUTCHISON GREIG.